(12) United States Patent
Dharmadhikari et al.

(10) Patent No.: US 9,032,504 B2
(45) Date of Patent: May 12, 2015

(54) SYSTEM AND METHODS FOR AN ALTERNATIVE TO NETWORK CONTROLLER SIDEBAND INTERFACE (NC-SI) USED IN OUT OF BAND MANAGEMENT

(71) Applicant: Dell Products L.P., Round Rock, TX (US)

(72) Inventors: Vivek Dharmadhikari, San Jose, CA (US); Marc Randolph, Richardson, TX (US); Allan Redenbaugh, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 156 days.

(21) Appl. No.: 13/710,384

(22) Filed: Dec. 10, 2012

(65) Prior Publication Data

US 2014/0165183 A1 Jun. 12, 2014

(51) Int. Cl.
*H04L 29/06* (2006.01)
*H04L 12/54* (2013.01)

(52) U.S. Cl.
CPC ........ *H04L 63/0227* (2013.01); *H04L 63/0209* (2013.01); *H04L 63/0236* (2013.01); *H04L 63/1458* (2013.01); *H04L 12/5696* (2013.01)

(58) Field of Classification Search
CPC .................................................. H04L 63/0227
USPC ......................................................... 726/13
See application file for complete search history.

(56) References Cited

U.S. PATENT DOCUMENTS

| | | | |
|---|---|---|---|
| 7,668,203 B1* | 2/2010 | Pannell et al. | 370/474 |
| 2009/0080419 A1* | 3/2009 | Kutch | 370/389 |
| 2010/0192218 A1* | 7/2010 | Shah et al. | 726/13 |
| 2011/0040917 A1* | 2/2011 | Lambert et al. | 710/301 |
| 2012/0163388 A1* | 6/2012 | Goel et al. | 370/395.53 |
| 2013/0173810 A1* | 7/2013 | Subramaniam | 709/227 |
| 2014/0115137 A1* | 4/2014 | Keisam | 709/223 |

OTHER PUBLICATIONS

Intel® Sideband Technology: An Overview of the Intel Server Manageability Interfaces, Jul. 2009, 86 pp.*
AlliedWare OS Software Reference for Software Version 2.9.1, chapter 8, 2006, 56 pages.*

* cited by examiner

*Primary Examiner* — Saleh Najjar
*Assistant Examiner* — Oleg Korsak
(74) *Attorney, Agent, or Firm* — Haynes and Boone, LLP

(57) ABSTRACT

A system and a method for operating a plurality of information handling systems forming a network are provided. The system includes a host computer processing unit (CPU); a band management controller (BMC); and a switch having a first port coupled to the host CPU, a second port coupled to the BMC, and an external port coupled to a network; wherein the switch is configured to perform lookups and send an ingress traffic including an internet content to the host CPU, and to send the ingress traffic including a management content to the BMC accordingly. A computer program product including a non-transitory computer readable medium having computer readable and executable code for instructing a processor in a management unit for a plurality of information handling systems forming a network to perform a method using a system as above is also provided.

20 Claims, 6 Drawing Sheets

SYSTEM AND METHODS FOR AN ALTERNATIVE TO NETWORK CONTROLLER SIDEBAND INTERFACE (NC-SI) USED IN OUT OF BAND MANAGEMENT

BACKGROUND

1.—Technical Field

The present disclosure is related to the field of out-of-band management in networks. More specifically, the present disclosure is related to providing alternatives to network controller side band interface(NC-SI) used for out-of-band management of devices such as servers, and L2/L3 switches coupled to a network.

2.—Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use similar to financial transaction processing, airline reservations, enterprise data storage, or global communications. In addition, information handling systems may include a variety of hardware and software components that may be configured to process, store, and communicate information and may include one or more computer systems, data storage systems, and networking systems.

Current state-of-the-art out-of-band management systems such as a service provider having a server, and L2/L3 switches, use a network controller (NC) that conforms to sideband interface (SI), or NC-SI specifications. A NC-SI compatible NC provides a standardized electrical and logical sideband interface to connect the NC to a band management controller (BMC). NC-SI compatible NCs allow network access to a host CPU via a system bus using a high speed peripheral interconnect such as PCI Express (PCIe). A sideband electrical interface in the NC-SI includes a Reduced Media Independent Interconnect (RMII). A sideband logical interface in the NC-SI includes messages defined in the NC-SI specification. However, use of NC-SI compatible NCs in an out-of-band management design is costly and requires the implementation of dedicated software. Furthermore, state-of-the-art NC-SI compatible NCs lack the capacity to handle denial of service (DOS) attacks and are poorly configured for firewall implementation.

What is needed is an alternative to NC-SI compatible NCs for out-of-band management without relying on expensive hardware that requires special software installation. What is also needed is an out-of-band management system that provides network security and a defense against DOS attacks.

SUMMARY

According to some embodiments, a system for operating a plurality of information handling systems forming a network may include a host computer processing unit (CPU); a band management controller (BMC); and a switch having a first port coupled to the host CPU, a second port coupled to the BMC, and an external port coupled to a network; wherein the switch is configured to perform lookups and send an ingress traffic including an internet content to the host CPU, and to send the ingress traffic including a management content to the BMC accordingly.

According to some embodiments, a computer program product may include a non-transitory computer readable medium having computer readable and executable code for instructing a processor in a management unit for a plurality of information handling systems forming a network to perform a method, the method including initializing a switch; setting a host computer processing unit (CPU) and a band management controller (BMC) in protected mode; setting an external port coupled to the switch in un-protected mode; blocking a traffic between protected modes; populating a table of network addresses; directing a first ingress packet from a network to the host CPU; and directing a second ingress packet from the network to the BMC.

According to some embodiments, an out of band network management system may be configured to be coupled to a service provider having resources, and to be coupled to a storage component and a computational component to provide a service to a plurality of users through a network, the out of band network management system may include a host computer processing unit (CPU); a band management controller (BMC); and a switch having a first port coupled to the host CPU, a second port coupled to the BMC, and an external port coupled to a network; wherein the switch is configured to send an ingress traffic including an internet content to the host CPU, and to send the ingress traffic including a management content to the BMC; and the switch is capable to couple to a second level layer in the network.

These and other embodiments of the present invention will be described in further detail below with reference to the following drawings.

BRIEF DESCRIPTION OF THE DRAWINGS

In the figures, elements having the same reference number have the same or similar functions.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources similar to a central processing unit (CPU) or hardware or software control logic, ROM, and/or other types of nonvolatile memory. Additional components of the information handling system may include one or more disk drives, one or more network ports for communicating with external devices similar to various input and output (IO) devices, similar to a keyboard, a mouse, and a video display. The information handling system may also include one or more buses operable to transmit communications between the various hardware components.

In an out-of-band management environment according to some embodiments, a switch configured for level 2 (L2) network capabilities may replace the operation of a network controller (NC) that conforms to NC-SI specifications. An L2 capable switch enables the use of standard top-of-rack (TOR) network servers that do not require a driver support in the underlying operating system. This avoids situations where the driver needed for an NC-SI NC is not available. Furthermore, use of an L2 capable switch reduces the cost of an out-of-band management system, as NC-SI compatible NCs are typically enterprise-grade and are costly. For a design with budget constraints, embodiments as disclosed herein offer a desirable solution for out-of-band management.

According to some embodiments, use of an L2-capable switch enhances the security of an out-of-band management system. Indeed, an L2-capable switch may include security features such as filtering based on MAC or IP addresses. In addition, some embodiments may include filters to avoid Denial of Service (DOS) attacks. In DOS attacks a host is bombarded with a multitude of packets from an illegitimate source. The packets create traffic that clogs the ingress pipeline to the system, thus impeding access to the host from a legitimate client. Therefore, embodiments as disclosed herein may offer enhanced security standards.

Figure 1:
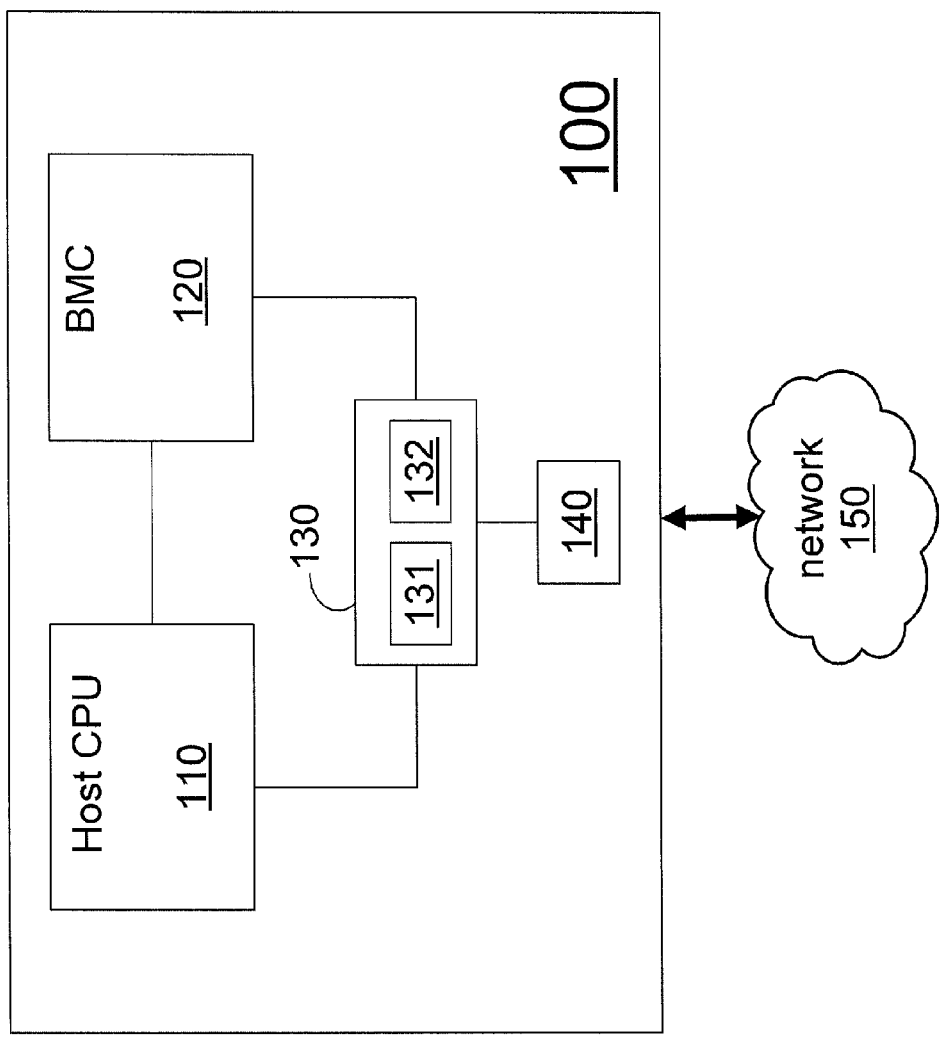
FIG. 1 illustrates a system for out-of-band management in a network, according to some embodiments.

FIG. 1 illustrates a system 100 for out-of-band management in a network 150, according to some embodiments. System 100 includes a host computer processing unit (CPU) 110, a Baseband Management Controller (BMC) 120, a switch 130, and an external port 140. According to some embodiments, switch 130 may be a 'level 2' capable switch (L2), such as an L2 switch or a 'level 3' (L3) capable switch. Switch 130 may include a processor circuit 131 and a memory circuit 132. According to some embodiments, processor circuit 131 is configured to execute commands stored in memory circuit 132. Memory circuit 132 may be an EEPROM, according to some embodiments. System 100 is coupled through external port 140 to a network 150.

In some embodiments, the configuration for switch 130 stored in memory circuit 132 may be provided by an IT administrator of system 100. The configuration for switch 130 may be done by an operating system such as provided by Dell Force 10 Networks (Force 10 Operating System, or FTOS), of San Jose, Calif. running on Host CPU 110. The IT administrator may establish network configuration parameters of system 100 according to service rules for a service provider including system 100. The service provider may include a datacenter having a server including system 100. According to some embodiments, the IT administrator also provides management instructions and information to BMC 120 in system 100. Furthermore, the IT administrator may change or modify the configuration of switch 130 by providing new code to memory circuit 132 through network 150.

In some embodiments, the IT administrator may keep Host CPU 110 and BMC 120 in the same virtual local area network (VLAN). In such configuration, Host CPU 110 and BMC 120 belong to same IP subnet by virtue of being in the same VLAN.

In some embodiments, the IT administrator may separate traffic to and from BMC 120 from traffic to and from host CPU 110 for security reasons. For example, the IT administrator may create a BMC VLAN and a host VLAN. In such configuration, the Host CPU 110 and BMC 120 belong to different IP subnets by virtue of being in different VLANs. External port 140 may be coupled to an upstream switch port configured in trunk mode according to the IEEE 802.Iq standard. The trunk mode allows traffic from different VLANs to be carried over the same physical link in network 150. In this particular case, the single physical link between switch 130 and an upstream switch in network 150 may include traffic (data packets) from a first VLAN including host CPU 110, and from a second VLAN including BMC 120.

Accordingly, system 100 including switch 130 may reduce configuration requirements, due to the general availability of L2 capable switches. While NC-SI compatible NCs may be desirable for dedicated network systems having a specialized application and a separate firewall setting configuration, embodiments of system 100 may offer advantages in terms of cost and simplicity of operation. Switch 130 may be easily reconfigurable by an IT administrator in system 100, through network 150. Furthermore, system 100 offers a reduced cost since switch 130 is typically cheaper than an enterprise grade NC-SI compatible NC. Switch 130 provides multiple options for security, as compared to an NC-SI compatible NC. For example, switch 130 may provide firewall filters to ingress and egress traffic through system 100. Switch 130 may also provide IP address filtering for ingress and egress traffic through system 100. Processor circuit 131 in switch 130 may perform algorithms on the ingress traffic to establish the legitimacy of an Internet source requesting access to system 100. Thus, switch 130 may be able to prevent DOS attacks on system 100.

Figure 2:
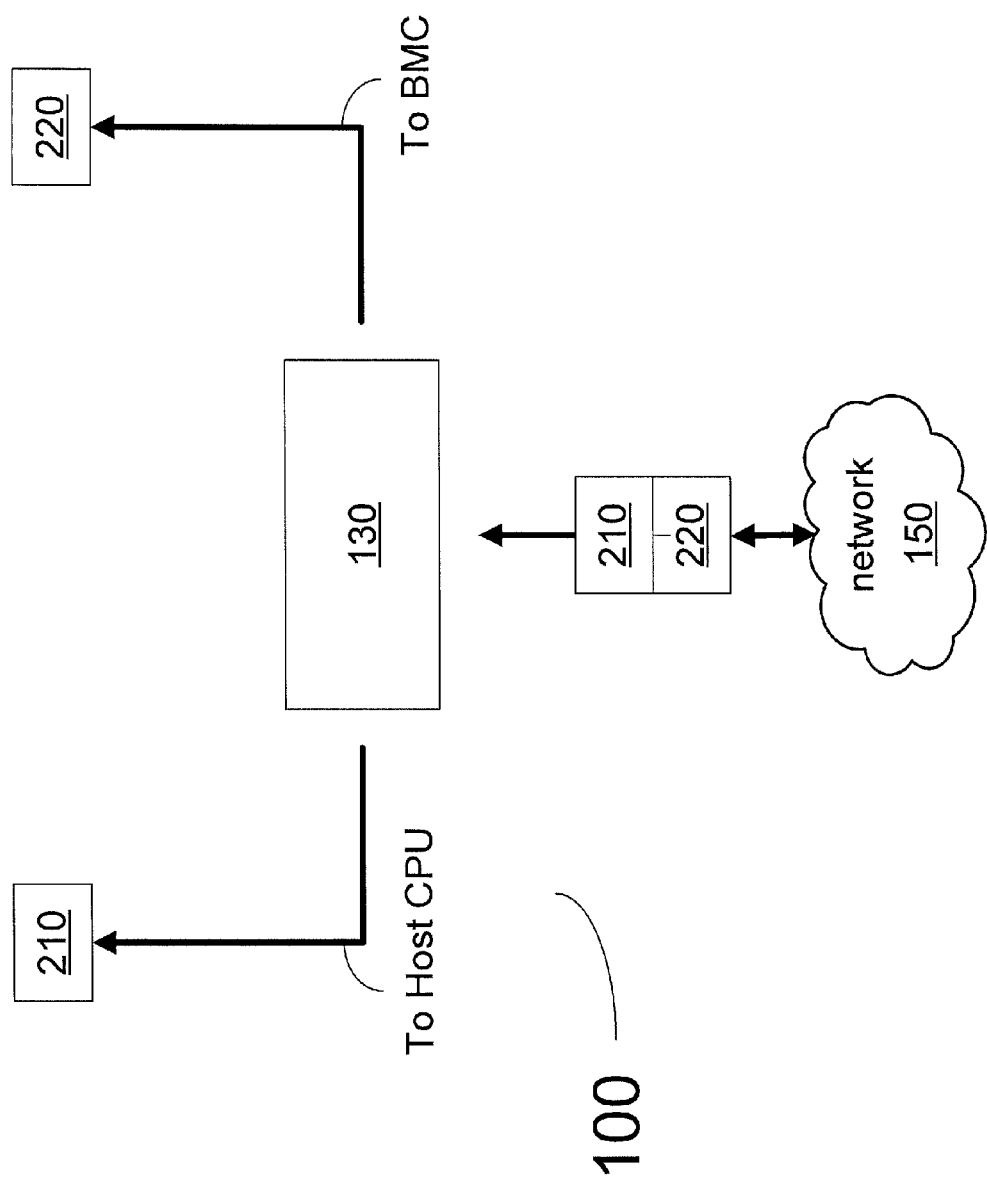
FIG. 2 illustrates an ingress traffic flow in a system for out-of-band management in a network, according to some embodiments.

FIG. 2 illustrates an ingress traffic flow in a system 100 for out-of-band management in a network 150, according to some embodiments. An ingress traffic flow from network 150 may include packets 210 and 220 entering system 100. Switch 130 determines the proper destination of each of packets 210 and 220. For example, when packet 220 contains network management information, switch 130 sends the packet to BMC 220. Likewise, when packet 210 contains regular internet content, switch 130 sends the packet to host CPU 210.

Figure 3:
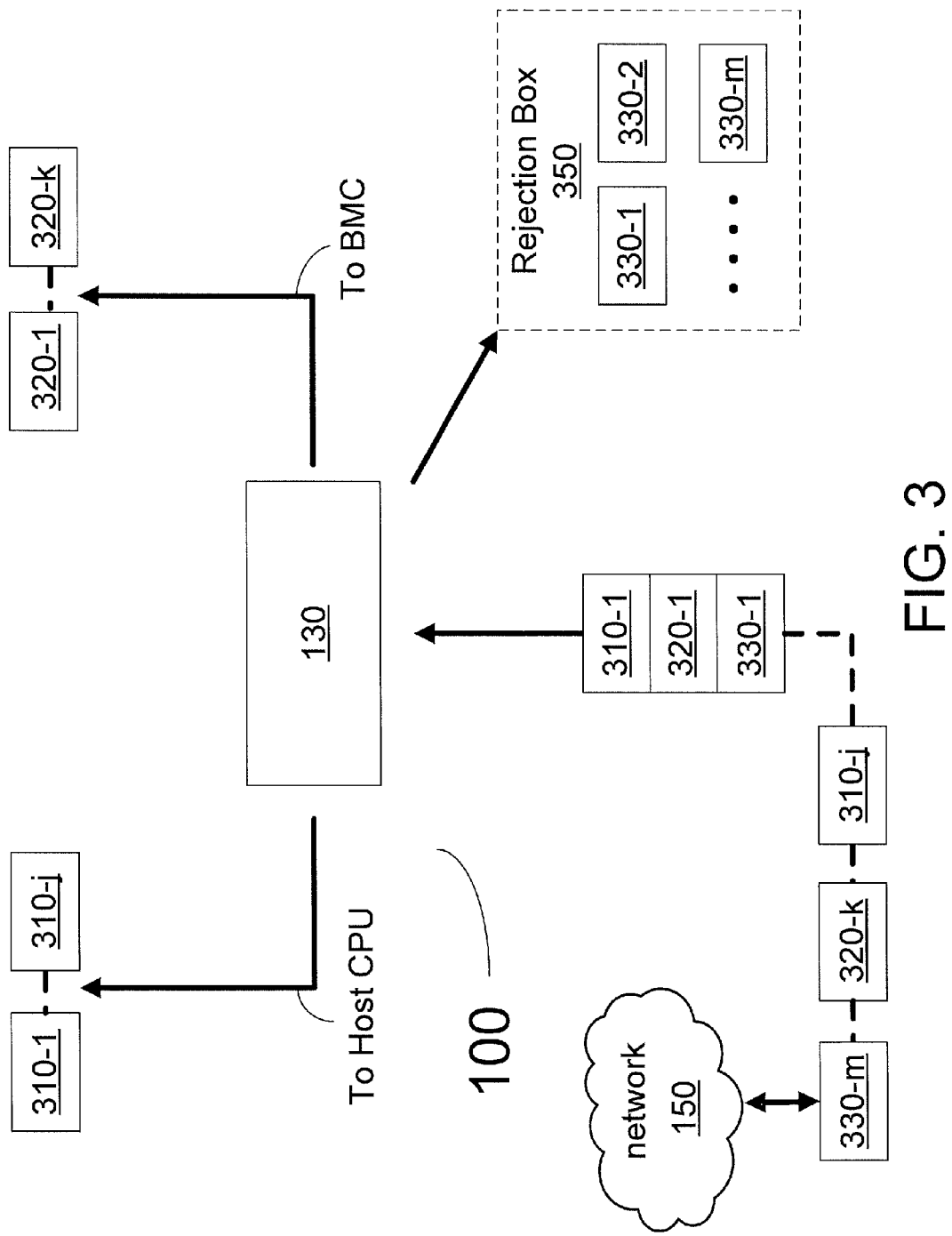
FIG. 3 illustrates a defense against denial of service (DOS) attack in a system for out-of-band management in a network, according to some embodiments.

FIG. 3 illustrates a defense against denial of service (DOS) attack in a system 100 for out-of-band management in a network 150, according to some embodiments. Accordingly, system 100 may receive ingress traffic from network 150 including packets 310-1 through 310-$j$ (collectively referred to as internet content packets 310) having regular internet content. Ingress traffic into system 100 may also include packets 320-1 through 320-$k$ (collectively referred to as management packets 320) having network management information. Ingress traffic into system 100 may include packets 330-1 through 330-$m$ (collectively referred to as illegitimate packets 330). Illegitimate packets 330 may include spurious requests for information in host CPU 110 from a malicious source. For example, in embodiments where system 100 is part of a datacenter in a network service provider, a malicious source may attempt to bombard system 100 with requests for information, in order to block access to the service provider for legitimate users.

In embodiments as illustrated in FIG. 3, switch 130 directs internet content packets 310 to host CPU 110. Also, switch 130 directs management packets 320 to BMC 120. Furthermore, switch 130 may be configured to identify illegitimate packets 330 and remove them from system 100 by placing them into a rejection box 350. In some embodiments, illegitimate packets 330 may simply be denied access to system 100 by switch 130 and returned to the data stream in network 150. In some embodiments, illegitimate packets 330 may be just dropped out of the data stream in network 150. Further according to some embodiments, rejection box 350 may temporarily store illegitimate packets 330 for a check procedure, to insure that the packets come from a malicious source.

Figure 4:
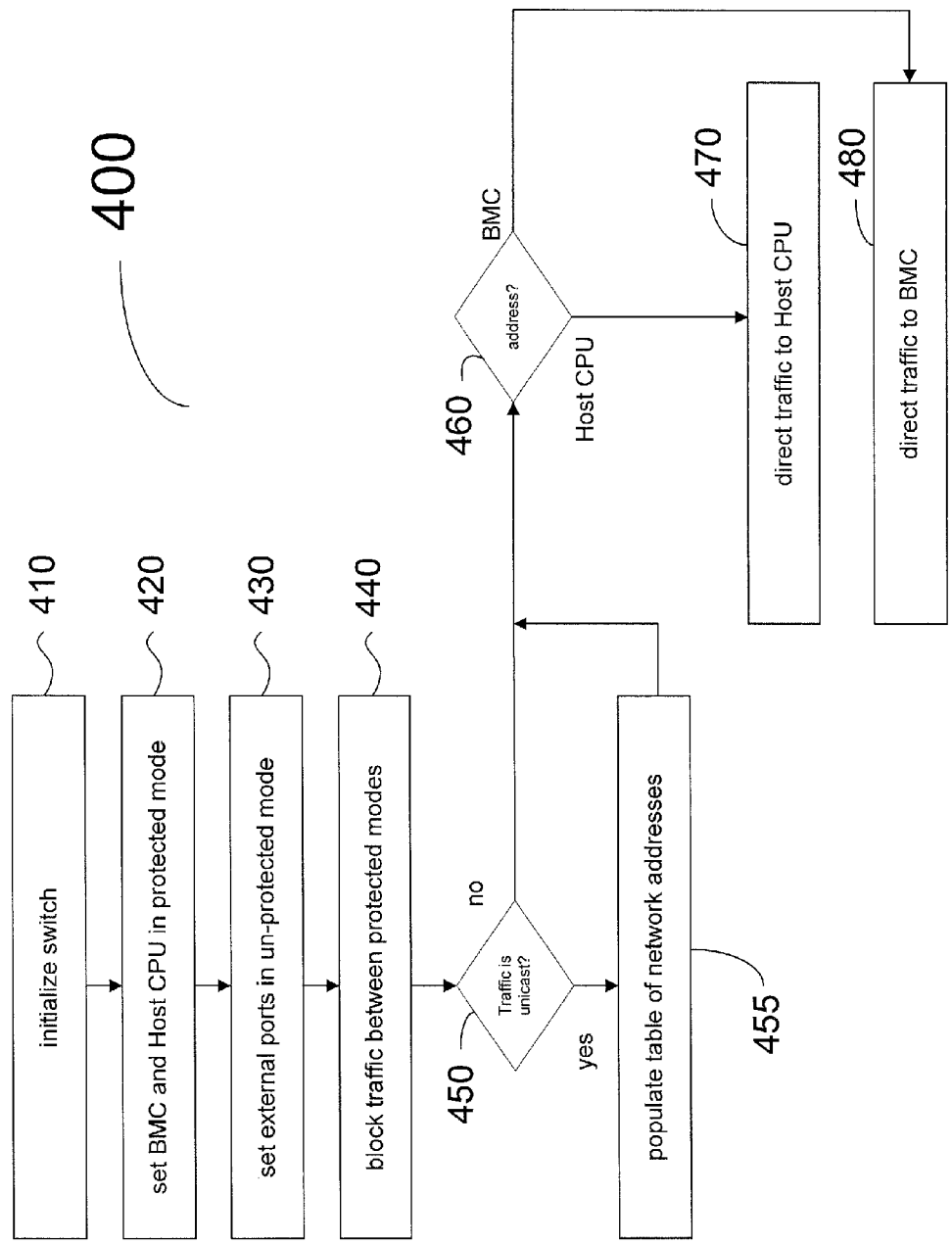
FIG. 4 illustrates a flow chart in a method for handling ingress traffic flow in a system for out-of-band management in a network, according to some embodiments.

FIG. 4 illustrates a flow chart in a method 400 for handling ingress traffic flow in a system for out-of-band management in a network, according to some embodiments. In some embodiments of method 400, a Host CPU and a BMC may belong to the same VLAN and IP subnet. A Host CPU in method 400 may be as Host CPU 110, and a BMC may be as BMC 120 (cf. FIG. 1). The system for out-of-band management may be system 100 and the network may be network 150, as described in detail above (cf. FIG. 1). Method 400 may be performed by switch 130 in out-of-band management system 100. For example, steps in method 400 may be performed at least partially by processor circuit 131 executing commands stored in memory circuit 132.

In step 410 switch 130 is initialized. Initialization of switch 130 may be performed according to a configuration and an operating system including commands stored in memory circuit 132. In step 420, BMC 120 is set in protected mode. Step 420 also includes setting host CPU 110 in protected mode. In step 430 external port 140 is set in un-protected mode, in order to receive traffic from network 150. In step 440 switch 130 is configured to block data traffic between protected modes. Thus, in some embodiments packets may ingress/egress host CPU 110 from/to network 150, through switch 130. Likewise, packets may ingress/egress BMC 120 from/to network 150, through switch 130. However, packets may not be able to transit directly between host CPU 110 and BMC 120.

In step 450 it is determined whether the ingress traffic is unicast or multicast. As one of ordinary skill would know, unicast traffic includes data packets following a single-point-to-single-point path, and multi cast traffic includes data packets following a single-point-to-multiple-point path. Broad cast traffic may also be included in step 450. Broadcast traffic includes data packets following a single-point-to-all-points path. The start point and end point of paths in unicast, multicast, and broadcast traffic may be defined by IP address, or a media access control (MAC) address, or any other suitable network address.

In step 455 a list of network addresses is populated when traffic is unicast. A network address may be a media access control (MAC) address. Thus, in some embodiments a MAC table is generated in step 455 when the traffic is unicast. The MAC table generated in step 455 may include the network address of host CPU 110 and of BMC 120. Furthermore, a MAC table in step 455 may include a list of IP network addresses blocked from accessing system 100 for security reasons.

In step 460 the destination address of the traffic is determined. When the address in step 460 points to host CPU 110, in step 470 the traffic is directed to host CPU 110. When the address in step 460 points to BMC 120, in step 480 the traffic is directed to BMC 120. In some embodiments, switch 130 may direct traffic to both host CPU 110, and BMC 120 if the traffic is broadcast or multicast. For example, an address resolution protocol (ARP) request packet will be sent to both host 110 and BMC 120, and will be responded to or dropped by both.

According to some embodiments, the traffic flow for an out-of-band management system using NC-SI compatible NC and a managed L2 switch are similar. Thus, switch 130 provides similar functionality of a NC-SI compatible NC and can be used in configurations where it is not possible to use NC-SI compatible NCs, for example due to budget constraints. Furthermore use of switch 130 provides enhanced security to a service provider using system 100.

Figure 5:
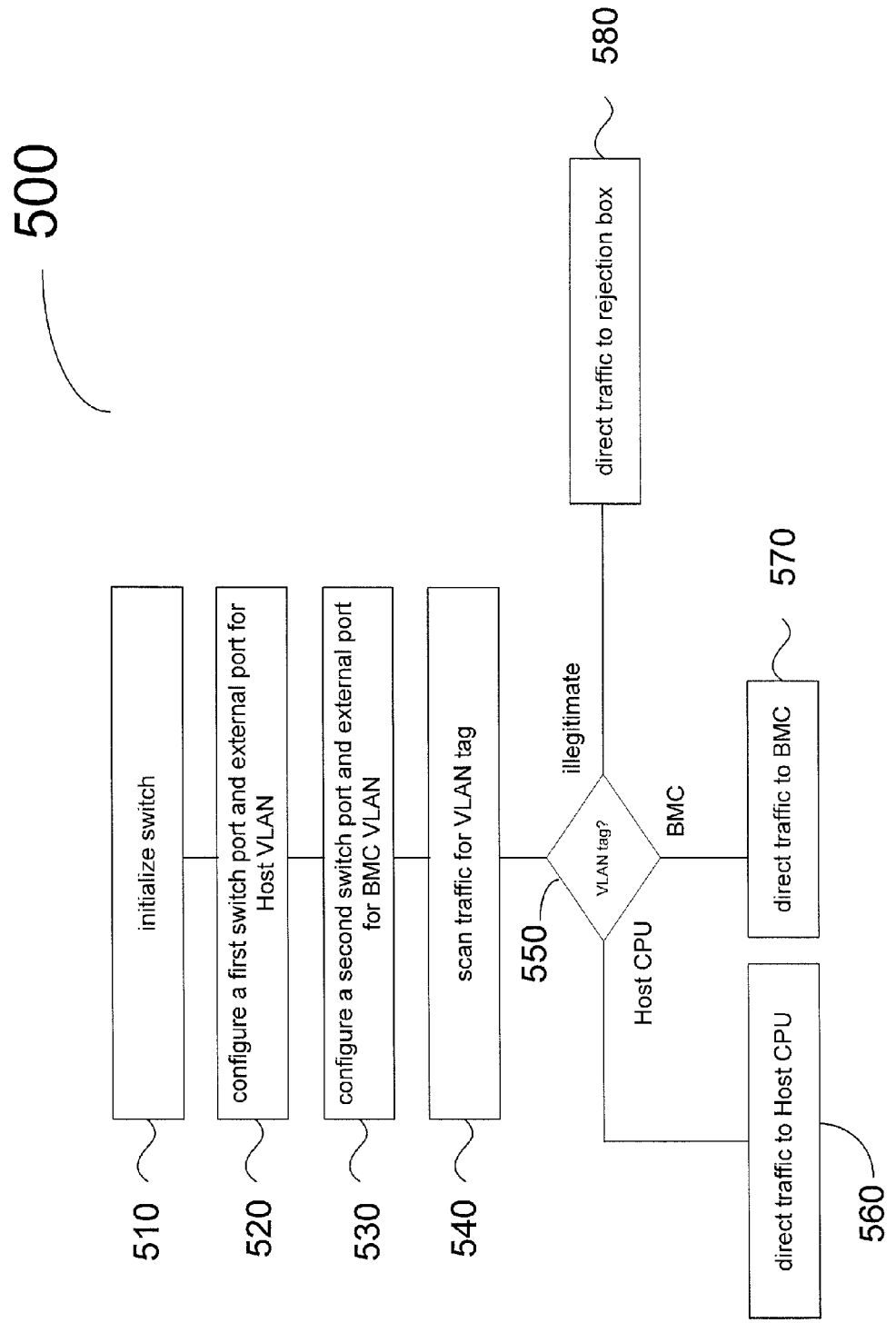
FIG. 5 illustrates a flow chart in a method for handling ingress traffic flow in a system for out-of-band management in a network, according to some embodiments.

FIG. 5 illustrates a flow chart in a method 500 for handling ingress traffic flow in a system for out-of-band management in a network, according to some embodiments. In some embodiments of method 500, a Host CPU and a BMC may belong to different VLAN and IP subnets. Accordingly, a Host CPU in method 500 may be as Host CPU 110, and a BMC may be as BMC 120, described in detail above (cf. FIG. 1). The system for out-of-band management may be as system 100 and the network may be as network 150 described in detail above (cf. FIG. 1). According to some embodiments, host CPU 110 and BMC 120 may be located in different VLANs. For example, host CPU 110 and BMC 120 may be located in different IP subnets, in system 100. Method 500 may be performed by switch 130 in out-of-band management system 100. For example, steps in method 500 may be performed at least partially by processor circuit 131 executing commands stored in memory circuit 132.

In step 510 switch 130 is initialized. Accordingly, step 510 may be as step 410 in method 400, described in detail above (cf. FIG. 4). In steps 520 and 530 the configuration of switch 130 may include configuring ports in switch 130 for the different VLANs associated to either host CPU 110 and BMC 120. For example, a first port in switch 130 coupled to host CPU 110 is configured for the VLAN associated with host CPU 110, in step 520. In some embodiments, external port 140 is also configured for the VLAN associated with host CPU 110 in step 520. Likewise, a second port in switch 130 coupled to BMC 120 is configured for the VLAN associated with BMC 120, in step 530. Further according to some embodiments, external port 140 may also be configured for the VLAN associated with BMC 120 in step 530. As a result, external port 140 may be configured for two different VLANs in method 500.

In step 540, network traffic entering external port 140 from network 150 is scanned for a VLAN tag. Accordingly, ingress unicast traffic into system 100 is processed in a similar way as ingress broadcast/multicast traffic, by virtue of the VLAN tag. In step 560 the network traffic is directed to host CPU 110 when the VLAN tag points to the host CPU, according to step 550. In step 570 the network traffic is directed to BMC 120 when the VLAN tag points to the BMC, according to step 550. Thus, data packets destined to host CPU 110 are separated from data packets destined to BMC 120. When the source of the traffic is determined to be illegitimate in step 550, the traffic is directed to a rejection box in step 580. The rejection box may be as rejection box 350, described in detail above (cf. FIG. 3).

Figure 6:
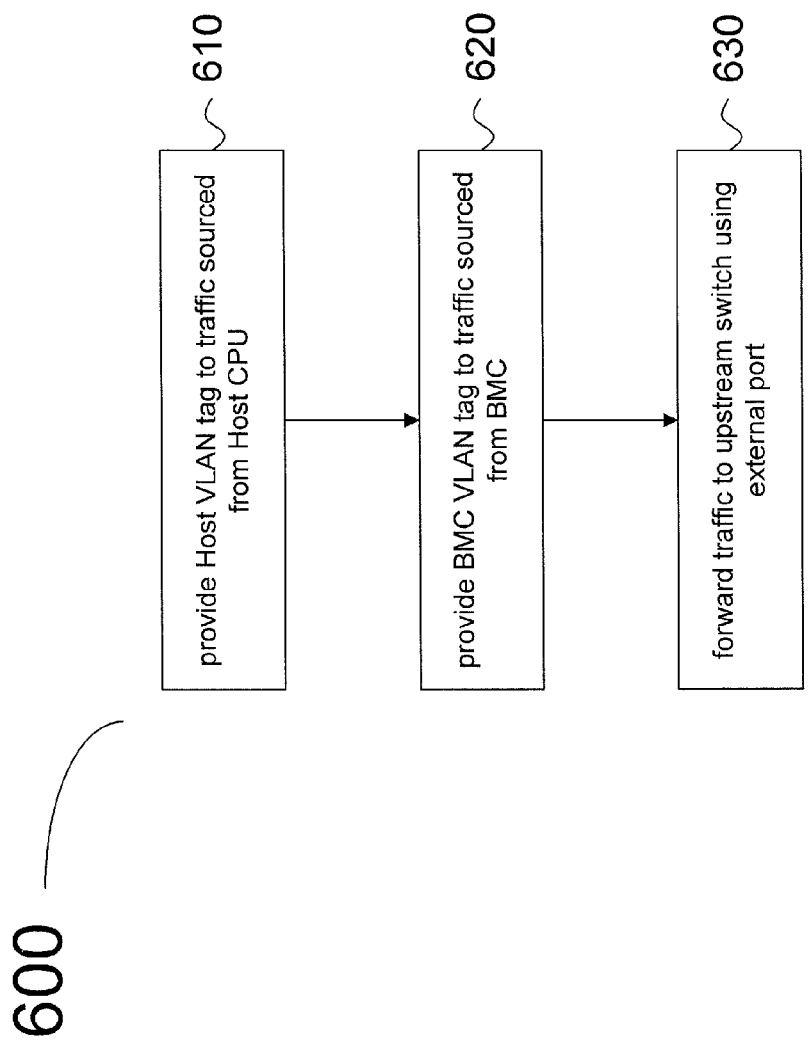
FIG. 6 illustrates a flow chart in a method for handling egress traffic flow in a system for out-of-band management in a network, according to some embodiments.

FIG. 6 illustrates a flow chart in a method 600 for handling egress traffic flow in a system for out-of-band management in a network, according to some embodiments. In some embodiments of method 600, a Host CPU and a BMC may belong to different VLAN and IP subnets. Accordingly, a Host CPU in method 600 may be as Host CPU 110, and a BMC may be as BMC 120, described in detail above (cf. FIG. 1). The system for out-of-band management may be as system 100 and the network may be as network 150 described in detail above (cf. FIG. 1). Method 600 may be performed by switch 130 in out-of-band management system 100. For example, steps in method 600 may be performed at least partially by processor circuit 131 executing commands stored in memory circuit 132. In embodiments where host CPU 110 and BMC 120 are configured for different VLANs, method 600 may include tagging egress data packets accordingly. Thus, unicast/multicast/broadcast traffic may be processed in a similar manner.

In step 610 a host VLAN tag is provided to traffic sourced from host CPU 110. In step 620 a BMC VLAN tag is provided to traffic sourced from BMC 120. In step 630 the traffic is forwarded to an upstream switch in network 150 through external port 140. Thus, egress unicast/multicast/broadcast traffic leaves external port 140 appropriately tagged.

In some embodiments, a first port in switch 130 coupled to host CPU 110 and a second port in switch 130 coupled to BMC 120 may be configured in protected mode. This may be the case when host CPU 110 and BMC 120 belong to different VLANs. In some embodiments, switch 130 may block egress traffic between protected ports. Thus, egress traffic sourced from host CPU 110 and BMC 120 is not seen by each other.

Embodiments of the invention described above are exemplary only. One skilled in the art may recognize various alternative embodiments from those specifically disclosed. Those alternative embodiments are also intended to be within the scope of this disclosure. As similar to such, the invention is limited only by the following claims.

What is claimed is:

1. A system for operating a plurality of information handling systems forming a network, the system comprising:
   a host computer processing unit (CPU);
   a band management controller (BMC); and
   a switch having a first port coupled to the host CPU, a second port coupled to the BMC, and an external port coupled to a network;
   wherein the switch is configured to:
      perform lookups;
      send an ingress traffic including an internet content to the host CPU;
      send the ingress traffic including a management content to the BMC; and
      block all traffic between the first port and the second port so that packets are not transmitted between the host CPU and the BMC.

2. The system of claim 1 wherein the switch comprises a processor circuit and a memory circuit, the memory circuit storing a code comprising a configuration for the switch.

3. The system of claim 2 wherein the configuration for the switch comprises a configuration for a host CPU virtual local area network (VLAN) in the first port, and a configuration for a BMC VLAN in the second port.

4. The system of claim 3 wherein the CPU VLAN and the BMC VLAN are the same.

5. The system of claim 3 wherein the CPU VLAN and the BMC VLAN are different.

6. The system of claim 1 wherein the switch drops ingress traffic including an illegitimate data packet.

7. The system of claim 1 wherein the ingress traffic is one from the group consisting of broadcast traffic, multicast traffic, and unicast traffic.

8. A computer program product comprising a non-transitory computer readable medium having computer readable and executable code for instructing a processor in a management unit for a plurality of information handling systems forming a network to perform a method, the method comprising:
   initializing a switch;
   setting a first port coupled to a host computer processing unit (CPU) and a second port coupled to a band management controller (BMC) in a protected mode;
   setting an external port coupled to the switch in an unprotected mode;
   blocking all traffic between ports in the protected mode so that packets are not transmitted between the host CPU via the first port and the BMC via the second port;
   populating a table of network addresses;
   directing a first ingress packet from a network to the host CPU; and
   directing a second ingress packet from the network to the BMC.

9. The computer program product of claim 8 wherein the method further comprises performing lookups and sending an ingress traffic including an internet content to the host CPU; and
   sending the ingress traffic including a management content to the BMC.

10. The computer program product of claim 8 wherein the method further comprises blocking an ingress packet from the network when a source of the ingress packet is illegitimate.

11. The computer program product of claim 8 wherein the setting the first port and the second port in the protected mode comprises configuring the first port in the switch according to a host CPU virtual local area network (VLAN), and configuring the second port in the switch according to a BMC VLAN.

12. The computer program of claim 11 wherein configuring the second port in the switch according to the BMC VLAN comprises configuring the second port according to the host CPU VLAN.

13. The computer program product of claim 8 further comprising directing a first egress packet from the host CPU to the network and directing a second egress packet from the BMC to the network.

14. The computer program product of claim 10 further comprising providing a first VLAN tag to the first egress packet and providing a second VLAN tag to the second egress packet.

15. An out of band network management system configured to be coupled to a service provider having resources, and to be coupled to a storage component and a computational component to provide a service to a plurality of users through a network, the out of band network management system comprising:
   a host computer processing unit (CPU);
   a band management controller (BMC); and
   a switch having a first port coupled to the host CPU, a second port coupled to the BMC, and an external port coupled to a network;
   wherein the switch is configured to:
      send an ingress traffic including an interne content to the host CPU;
      send the ingress traffic including a management content to the BMC;
      block transmission of all traffic between the first port and the second port; and
      couple to a second level layer in the network.

16. The out of band network management system of claim 15 wherein the configuration for the switch comprises a configuration for a host CPU virtual local area network (VLAN) in the first port, and a configuration for a BMC VLAN in the second port.

17. The out of band network management system of claim 16 wherein the CPU VLAN and the BMC VLAN are the same.

18. The out of band network management system of claim 16 wherein the CPU VLAN and the BMC VLAN are different.

19. The out of band network management system of claim 15 wherein the switch drops ingress traffic including an illegitimate data packet.

20. The out of band network management system of claim 18 wherein the ingress traffic is one from the group
consisting of broadcast traffic, multicast traffic, and unicast traffic.

* * * * *